(12) United States Patent
Rakshit et al.

(10) Patent No.: US 10,809,818 B2
(45) Date of Patent: Oct. 20, 2020

(54) DIGITAL PEN WITH DYNAMICALLY FORMED MICROFLUIDIC BUTTONS

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 15/984,519

(22) Filed: May 21, 2018

(65) Prior Publication Data

US 2019/0354205 A1 Nov. 21, 2019

(51) Int. Cl.
*G06F 3/0354* (2013.01)

(52) U.S. Cl.
CPC .................. *G06F 3/03545* (2013.01)

(58) Field of Classification Search
CPC ..... G06F 3/03545; G06F 3/038; G06F 3/0383
See application file for complete search history.

(56) References Cited

U.S. PATENT DOCUMENTS

| | | | |
|---|---|---|---|
| 7,745,207 B2 | 6/2010 | Jovanovich et al. | |
| 8,830,174 B1* | 9/2014 | Rodoper | G06F 1/1666 340/407.2 |
| 2006/0227116 A1 | 10/2006 | Zotov et al. | |
| 2011/0310066 A1 | 12/2011 | Fermgard et al. | |
| 2014/0253463 A1* | 9/2014 | Hicks | G06F 3/03545 345/173 |
| 2015/0324040 A1* | 11/2015 | Ciesla | G06F 3/0202 345/174 |
| 2016/0202761 A1 | 7/2016 | Bostick et al. | |
| 2016/0202762 A1 | 7/2016 | Tomaru et al. | |
| 2016/0320870 A1 | 11/2016 | Bell | |

FOREIGN PATENT DOCUMENTS

WO 2014182866 A1 11/2014

\* cited by examiner

*Primary Examiner* — Yaron Cohen
(74) *Attorney, Agent, or Firm* — L. Jeffrey Kelly

(57) ABSTRACT

A digital pen with dynamically formed microfluidic buttons formed in variable positions on the digital pen comprises a pen body having a first end, a second end, and an external pen body surface. The pen tip attached or formed to the first end of the pen body. One or more sensors associated with the external pen body surface detect contact points where a user is holding the digital pen. The microfluidic buttons are formed via action of a microfluidic layer on the pen body in a vicinity of the contact points detected by the one or more sensors. A power source powers the digital pen. A communication module connects the digital pen to a software module. A software user interface associated with a processor maps computerized functions to the one or more microfluidic buttons and action of the pen tip to one or more functions.

19 Claims, 11 Drawing Sheets

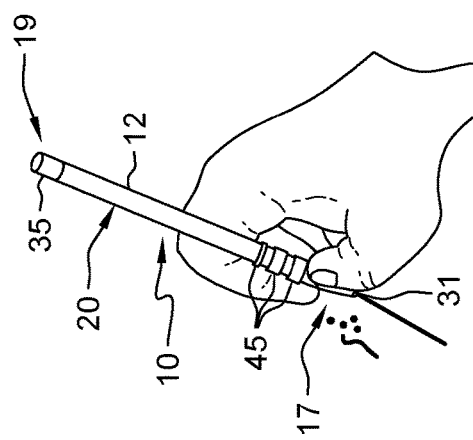
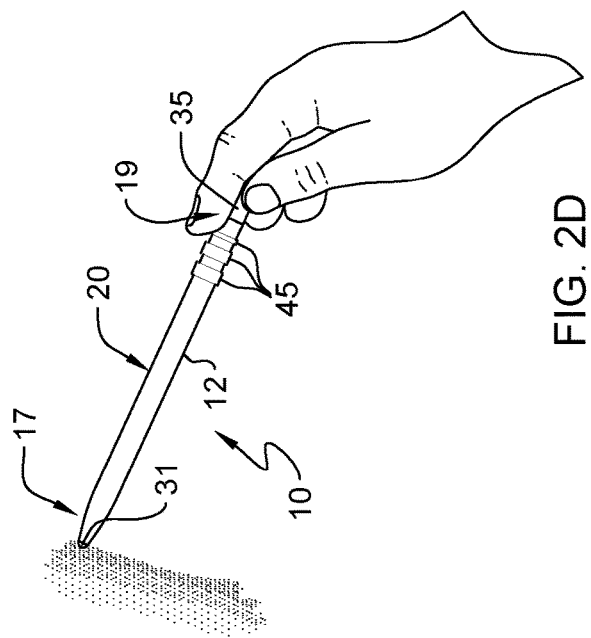
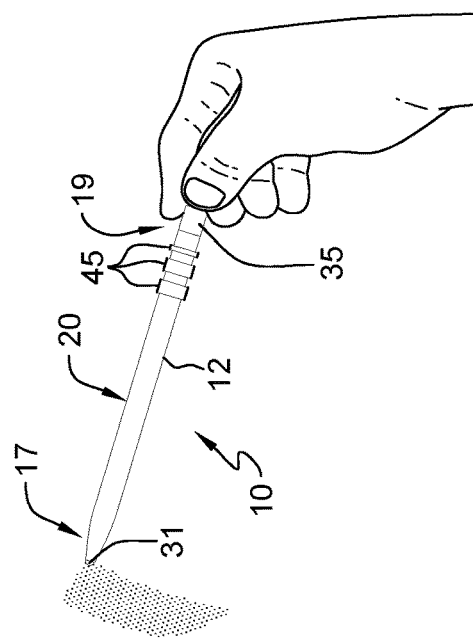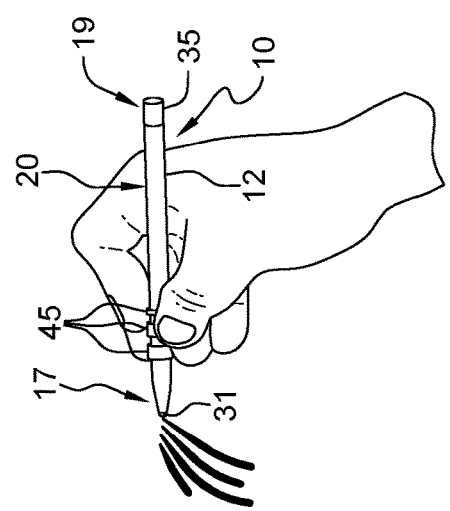
FIG. 2A
FIG. 2B
FIG. 2C
FIG. 2D

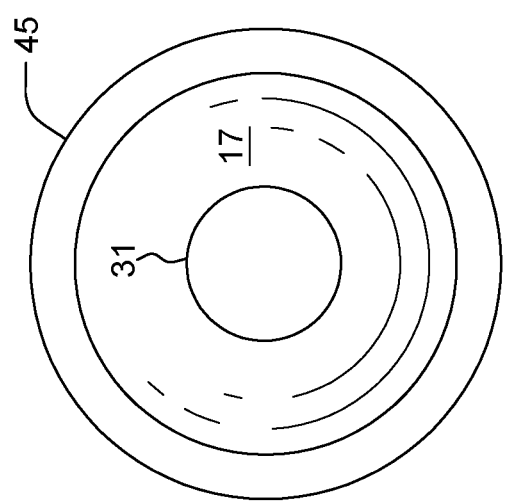

DIGITAL PEN WITH DYNAMICALLY FORMED MICROFLUIDIC BUTTONS

BACKGROUND

The present invention relates generally to the field of computer input devices, and, more particularly, to digital pens.

BRIEF SUMMARY

Embodiments of the present invention disclose a digital pen with one or more dynamically formed microfluidic buttons formed in variable positions on the digital pen, The digital pen comprises a pen body having a first end, a second end, and an external pen body surface. A pen tip is attached or formed to the first end of the pen body. One or more sensors associated with the external pen body surface detect contact points where a user is holding the digital pen. One or more microfluidic buttons are formed via action of a microfluidic layer on the pen body in a vicinity of the contact points where the user is holding the digital pen, as detected by the one or more sensors. A power source powers the digital pen. A communication module connects the digital pen to a software module. A software user interface associated with a processor, maps computerized functions to the one or more microfluidic buttons and action of the pen tip to one or more drawing functions or writing functions.

BRIEF DESCRIPTION OF THE DRAWINGS

These and other features, aspects, and advantages of the present invention will become better understood with regard to the following detailed description and accompanying drawings where:

FIGS. 2A, 2B, 2C, and 2D are side elevational views of the representative digital pen with microfluidic buttons embodying characteristics of the present invention as shown in FIG. 1 being held by a user in various ways.

FIG. 3 is a cut-away, side view of the representative digital pen embodying characteristics of the present invention as shown in FIG. 1 displaying a microfluidic button and underlying microfluidic layer contained within the pen body.

DETAILED DESCRIPTION

Digital pens are increasingly used as an alternative to traditional pens, pencils, brushes, and other traditional writing and artistic tools for any sort of application where writing, drawing, or painting is required. Digital pens are more than pieces of plastic, wood, or metal, and contain a processor, power source or cable to a power source, and communication modules capable of communicating with eternal devices, inter alia, in performing in a digital fashion all of the functions associated with traditional writing and artistic tools. Since pens, pencils, and brushes may be held with different grips by the artist, in order for a digital pen to best simulate each of these tools the digital pen should be capable of being held in different ways. If, for example, the digital pen is used to simulate a brush, a user may hold the digital pen towards the back, to best move the digital pen with brush stroke-like motions when simulating painting with a traditional paint brush. If the digital pen is used to simulate a pen or a pencil, a user will hold the digital pen closer to the pen tip to best simulate a traditional pen or pencil. In any circumstance, the digital pen may need buttons to allow the user to access various functionality associated with the digital pen, such as change the color used, change a size or type of the brush, etc. Since the digital pen may need to be held in different ways to best allow the digital pen to be used as pen, pencil, brush, etc., buttons should be placed on the pen body in a convenient location, but since the grip on the digital pen changes as the digital pen is used in different ways, a button location which is convenient in one grip may be inconvenient in a different grip. Accordingly, the presently disclosed invention discloses a digital pen with one or more dynamically formed microfluidic buttons formed in variable positions on the digital pen.

Figure 1:
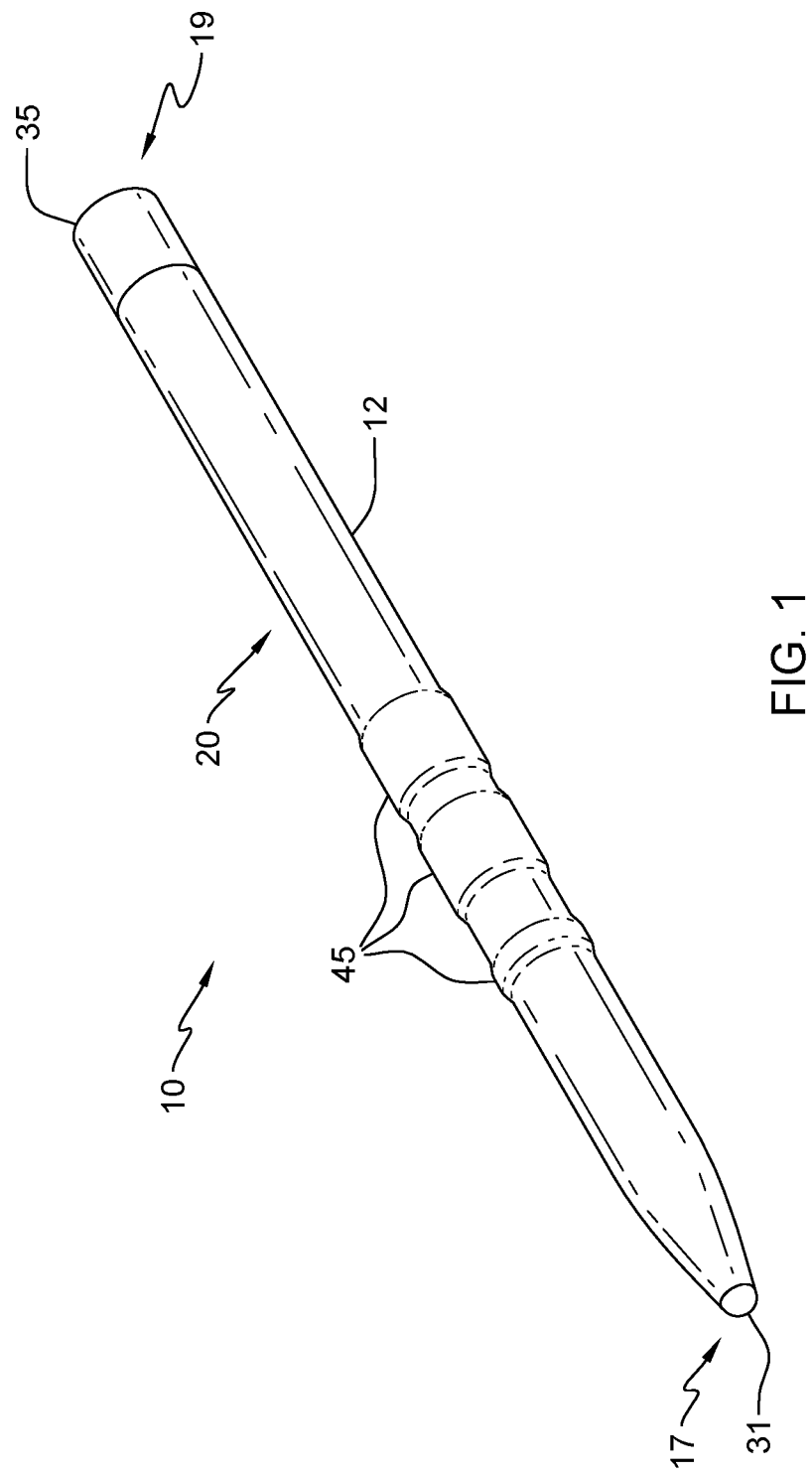
FIG. 1 is a perspective view of a representative digital pen with microfluidic buttons embodying characteristics of the present invention.

Referring now to the drawings for a better understanding of the present invention, a representative digital pen is displayed generally in FIG. 1 et seq. by reference number 10. As displayed in FIG. 1 et seq., digital pen 10 appears similar to a traditional pen or pencil, and includes a pen body 12 with a first end 17, a second end 19, and an external pen body surface 20. A pen tip 31 for writing, drawing, or painting with the digital pen 10 is attached or formed to the first end 17 of the pen body 12. In the preferred embodiment of the invention, the pen body 12 is formed in plastic, metal, or wood.

As the digital pen 10 is held by a user in different ways, such as displayed in FIGS. 2A, 2B, 2C, and 2D, one or more sensors associated with external pen body surface 20 detect contact points where a user is holding the digital pen 10. The one or more sensors, in the preferred embodiment of the invention, are capacitive or resistive touch sensors incorporated into a flexible, partially-transparent material covering, some, most, or all of the external pen body surface 20, although in alternate embodiments of the invention any presently existing or after-arising type of sensor which allows the sensing of direct contact points where the user is holding the digital pen 10 is contemplated.

Digital pen 10 includes one or more microfluidic buttons 45 formed on the pen body 12 via action of a microfluidic layer 60 on the pen body 12 in a vicinity of the contact points detected by the one or more sensors where the user is holding the digital pen 10. In the preferred embodiment of the invention, the microfluidic buttons 45 are ring-like in shape, surrounding the entirety of the pen body 12, but in alternate embodiments the microfluidic buttons 45 are ovular or substantially circular in shape as displayed further in connection with FIGS. 8-11 and designated as 45'. In the preferred embodiment of the invention, the microfluidic buttons 45 are formed automatically by the digital pen 10 when the grip on the digital pen 10 by the user changes, the microfluidic buttons 45 formed in a location on the pen body 12 of the digital pen 10 convenient for the user to actuate based upon the current grip of the user. In various embodiments of the invention, in order to change the location of the microfluidic buttons 45 the user makes a request to change the location of the microfluidic buttons 45 via utilization of a software user interface 90 or pressing of another button (or combination of buttons) on the digital pen 10.

Figure 4:
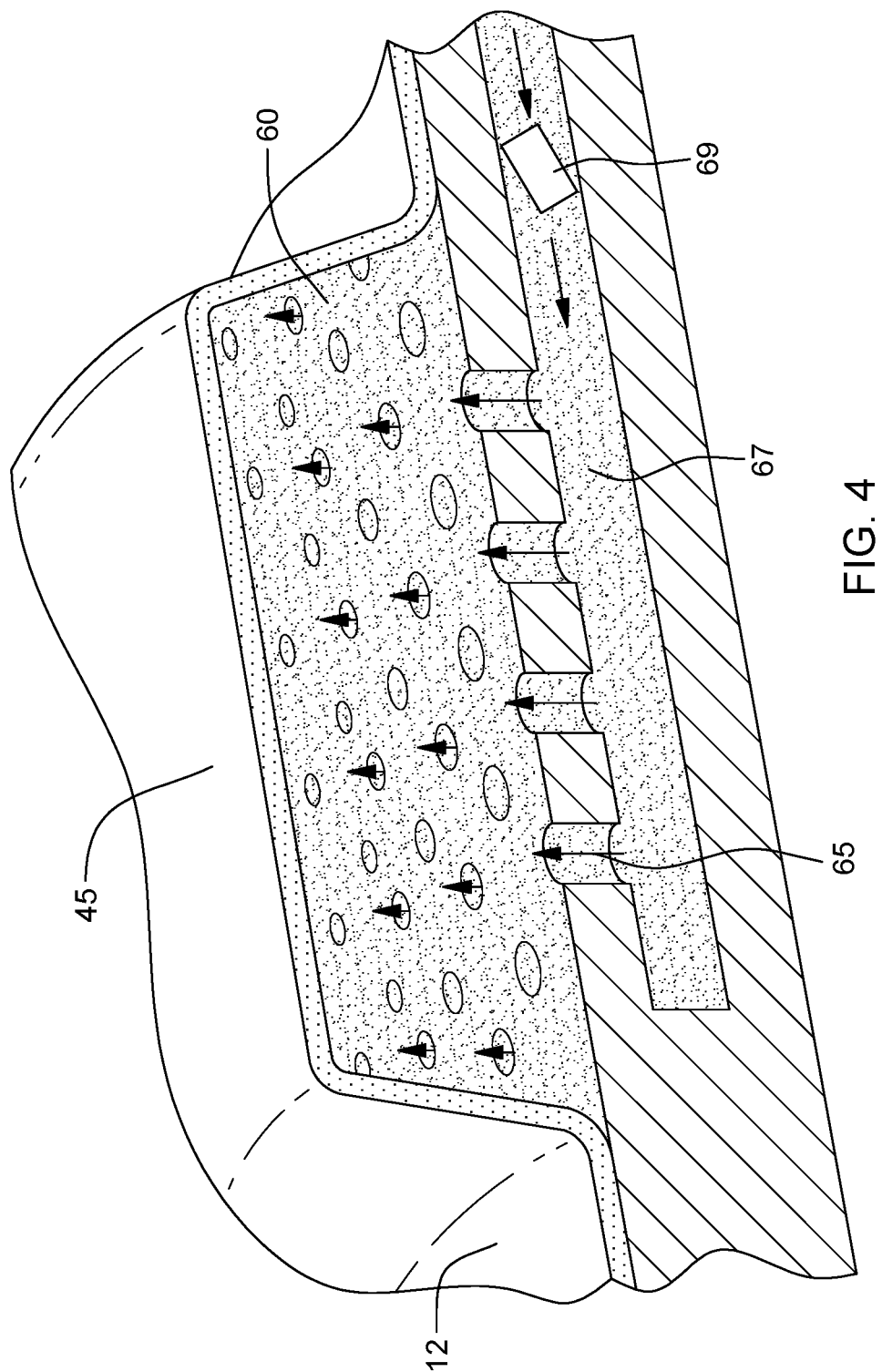
FIG. 4 is a cut-away, perspective view of the representative digital pen embodying characteristics of the present invention as shown in FIG. 1 displaying a cut-away of a microfluidic button contained within the pen body and underlying microfluidic layer.
Figure 5:
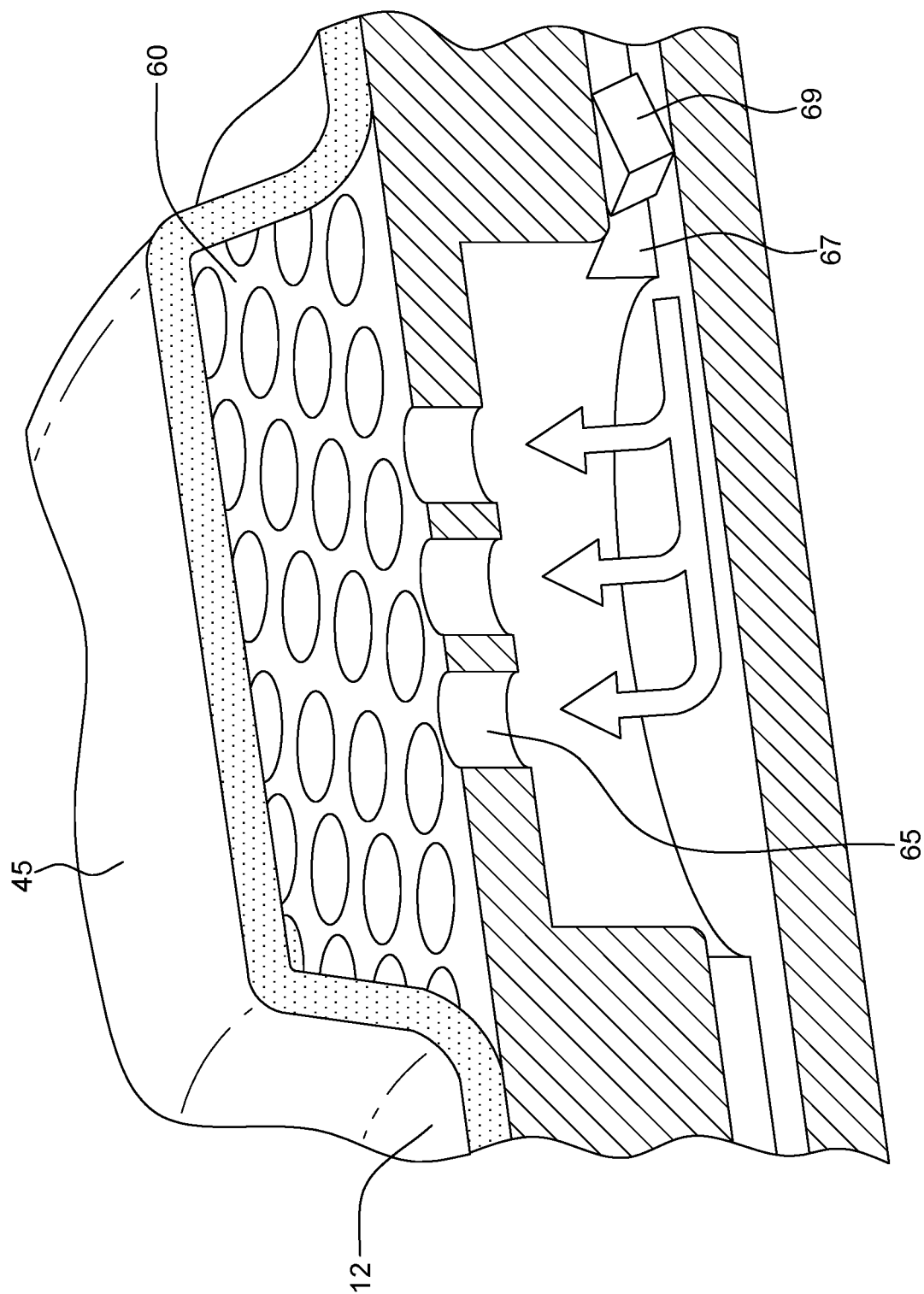
FIG. 5 is a cut-away, schematic view of a representative digital pen embodying characteristics of the present invention as shown in FIG. 1 displaying a cut-away of a microfluidic button contained within the pen body and underlying microfluidic layer.

In the preferred embodiment of the invention, the microfluidic layer 60 is contained substantially within the pen body 12 and beneath the external pen body surface 20 to generate each microfluidic button 45, as shown in FIGS. 3-5. Action of microfluidic channels 67 and microfluidic locks 69 inside of digital pen 10 force an amount of pressurized microfluidic fluid into the microfluidic layer 60 through microfluidic grate 65 beneath microfluidic button 45, causing a section of the external pen body surface 20 to "blister" and form microfluidic button 45. After formation of the microfluidic layer 60 and the microfluidic button 45, the interior section of microfluidic button 45 and a portion of microfluidic grate 65 facing the microfluidic button 45 may be utilized by user to complete a circuit, in performing an action associated with the microfluidic button 45. In alternate embodiments of the invention, other means of forming a microfluidic button 45 by action of the microfluidic layer 60 are specifically contemplated. The pressure required to actuate each microfluidic button 45 may be adjustable by the user to become harder or softer, in various embodiments of the invention. In various embodiments of the invention, the microfluidic fluid may be pressured via a miniature pump, capillary action, constrictions caused by various components of the digital pen 10, or by any other means of pressurizing fluid presently existing or after-arising.

Digital pen 10 relies upon electrical energy for performing various functions as discussed herein. In the preferred embodiment of the invention, the power source 35 is located in the second end 19 of the digital pen 10 to power the digital pen 10. In alternate embodiments (not pictured), the power source 35 is contained elsewhere within the digital pen 10, or a power cable (or power/data cable) is attached to the digital pen 10 from an external source such as from computing device 80.

Figure 6:
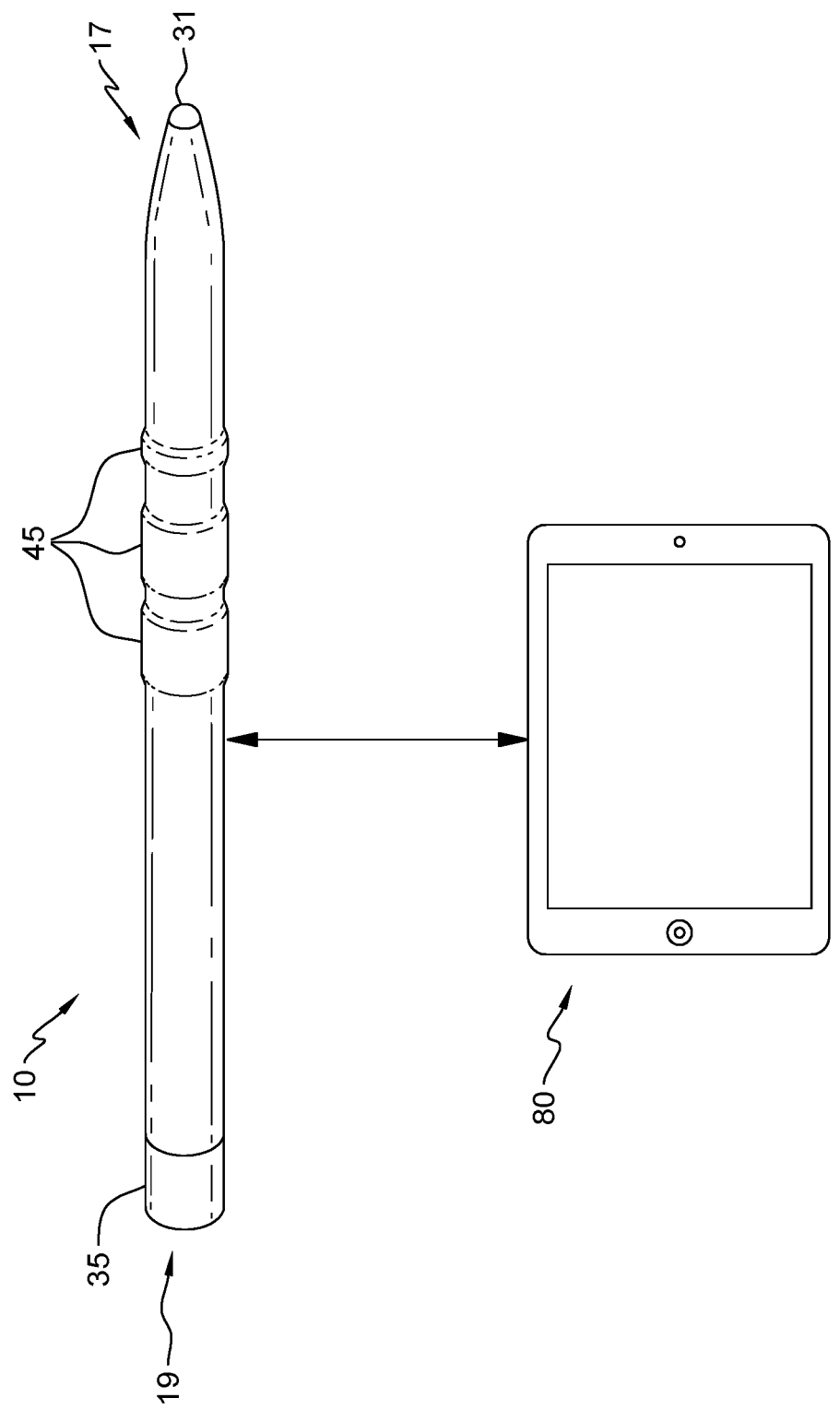
FIG. 6 is a perspective view of the representative digital pen with microfluidic buttons embodying characteristics of the present invention as shown in FIG. 1 operatively connected with a computing device.
Figure 7:
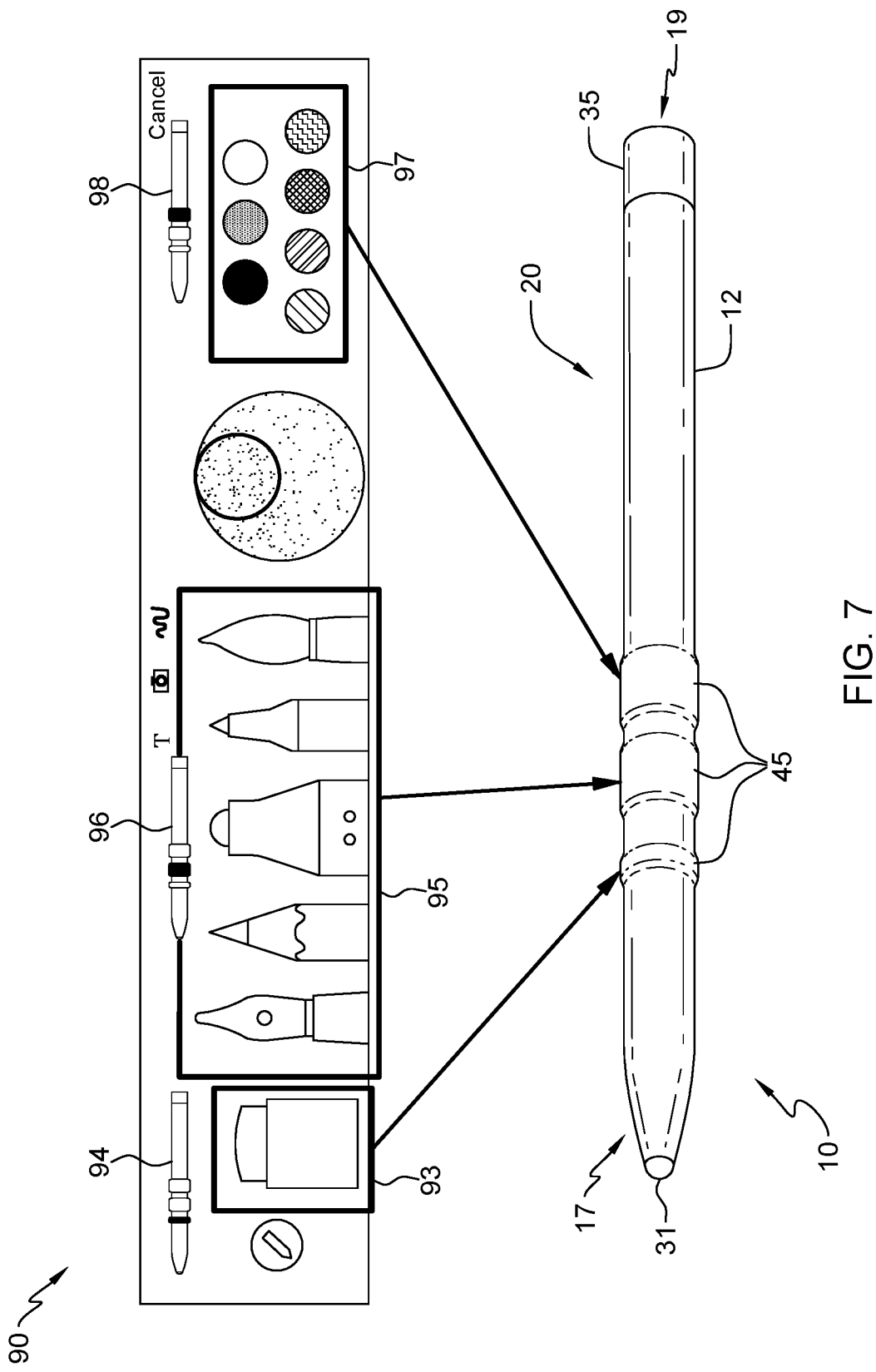
FIG. 7 is a perspective view of the representative digital pen with microfluidic buttons embodying characteristics of the present invention as shown in FIG. 1 associated with a software interface to map computerized functions to the microfluidic buttons.
Figure 8:
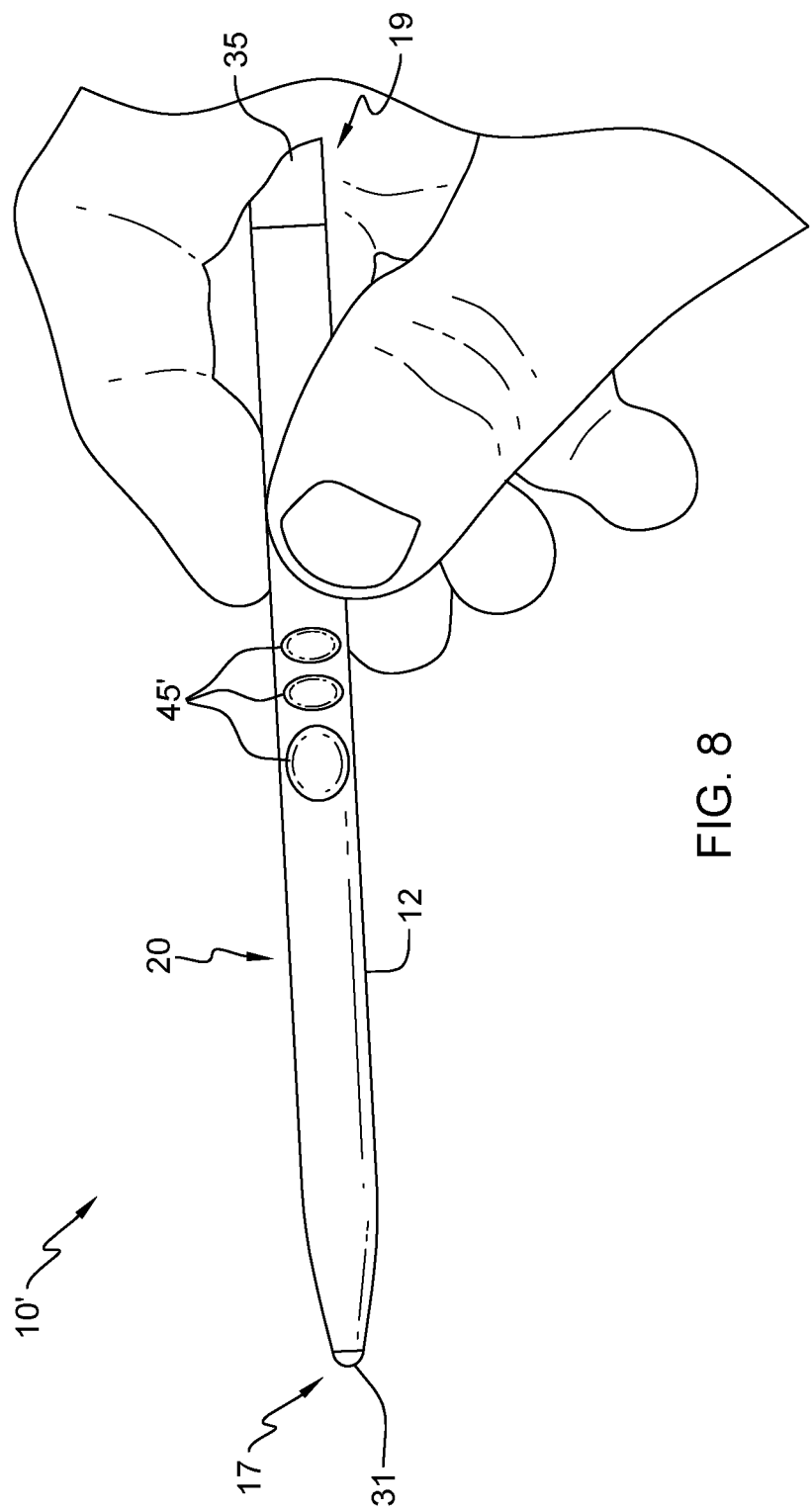
FIG. 8 is a perspective view of a digital pen with microfluidic buttons embodying characteristics of the present invention showing an alternative embodiment of the invention having circular microfluidic buttons being held by a user.
Figure 9:
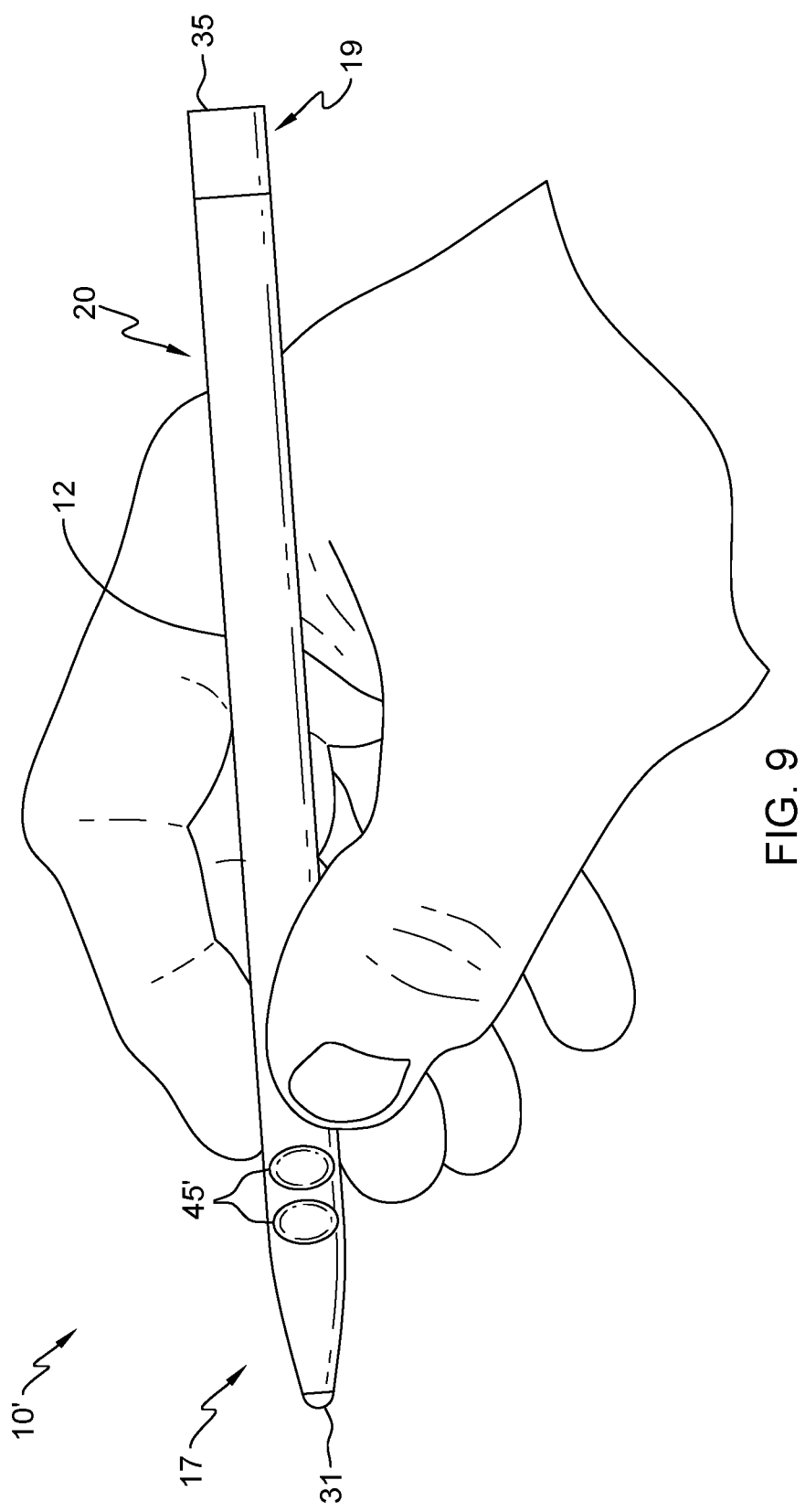
FIG. 9 is a perspective view of the digital pen with circular microfluidic buttons embodying characteristics of the present invention as shown in FIG. 8 being held by a user in a different way.

As shown in FIGS. 6-7, in the preferred embodiment, digital pen 10 is associated with a computing device 80 having a processor (such as a tablet computer). In alternate embodiments, the computing device 80 may be a personal data assistant, smart phone, traditional personal computer, or any other computing device presently existing or after-arising. The digital pen 10 to use the pen tip 31 to allow the user to draw, write, paint, etc. on the screen of computing device 80 (with the aid of the microfluidic buttons 45), as further discussed herein. A communication module (not shown) connects the digital pen 10 with a software module of the computing device 80. The communication module utilizes, in connecting the digital pen 10 with the computing device 80 in various embodiments of the invention, a Bluetooth connection, and infrared connection, or cable. The communication module allows the digital pen 10 to be utilized to draw, write, paint, etc. on the screen of the computing device 80, via utilization of a capacitive or resistive screen on the computing device 80 in conjunction with an art program, document processing software, an electronic notepad, etc., as would be understood by one of skill in the art.

In the preferred embodiment of the invention, the computing device 80 may also offer a software user interface 90 for mapping various computerized functions to the one or more microfluidic buttons 45, as shown in FIG. 7, for utilization in connection with action of the digital pen 10. An eraser function 93 is displayed in the software user interface 90 for selection 94 with the microfluidic button 45. A pen choice 95 is displayed in the software user interface 90 for selection 96 with the microfluidic button 45. A color selection 97 is also displayed in the software user interface 90 for selection 98 with the microfluidic button 45. A visual display of each microfluidic button 45 is displayed in the software user interface 90 for selection 94, 96, 98 by the user in the software user interface 90. Selection 94 allows an eraser 93 to be toggled by the user with microfluidic button 45. Selection 96 allows pen choice 95 to be toggled by the user with microfluidic button 45. Selection 98 allows the user to toggle through color choices for use by the digital pen 10, with actuation by microfluidic button 45. In alternate embodiments of the invention, the software user interface 90 offers other computerized functions, such as offering a paint brush (and width, type, color, etc.), a pencil (and width, type, color, etc.), etc. to be utilized in connection with the digital pen 10, or offer user the alternative to rotate through available functionality for utilization with each microfluidic button 45.

Figure 10:
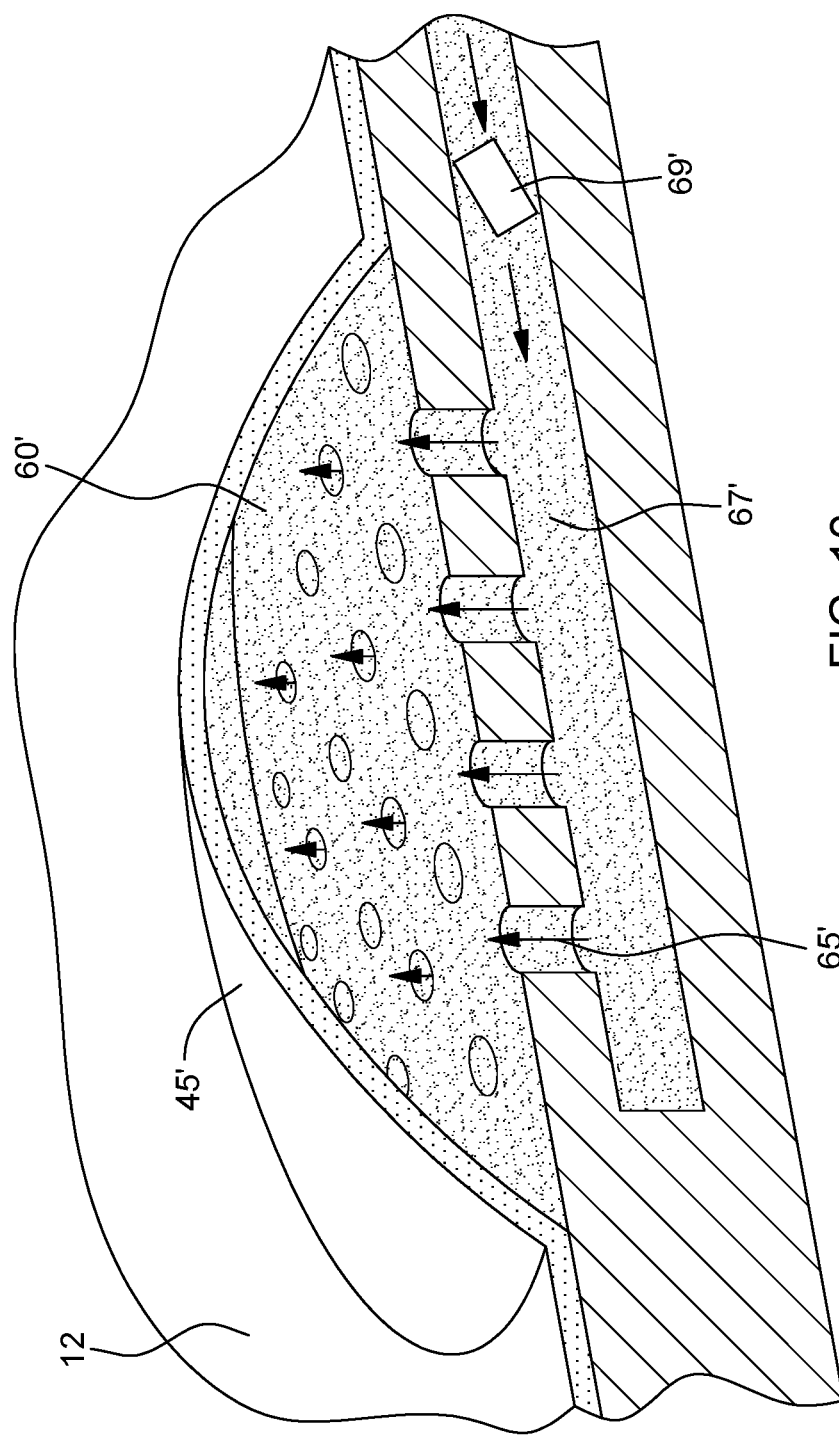
FIG. 10 is a cut-away, side view of the representative digital pen embodying characteristics of the present invention as shown in FIG. 8 displaying a circular microfluidic button and underlying microfluidic layer contained within the pen body.
Figure 11:
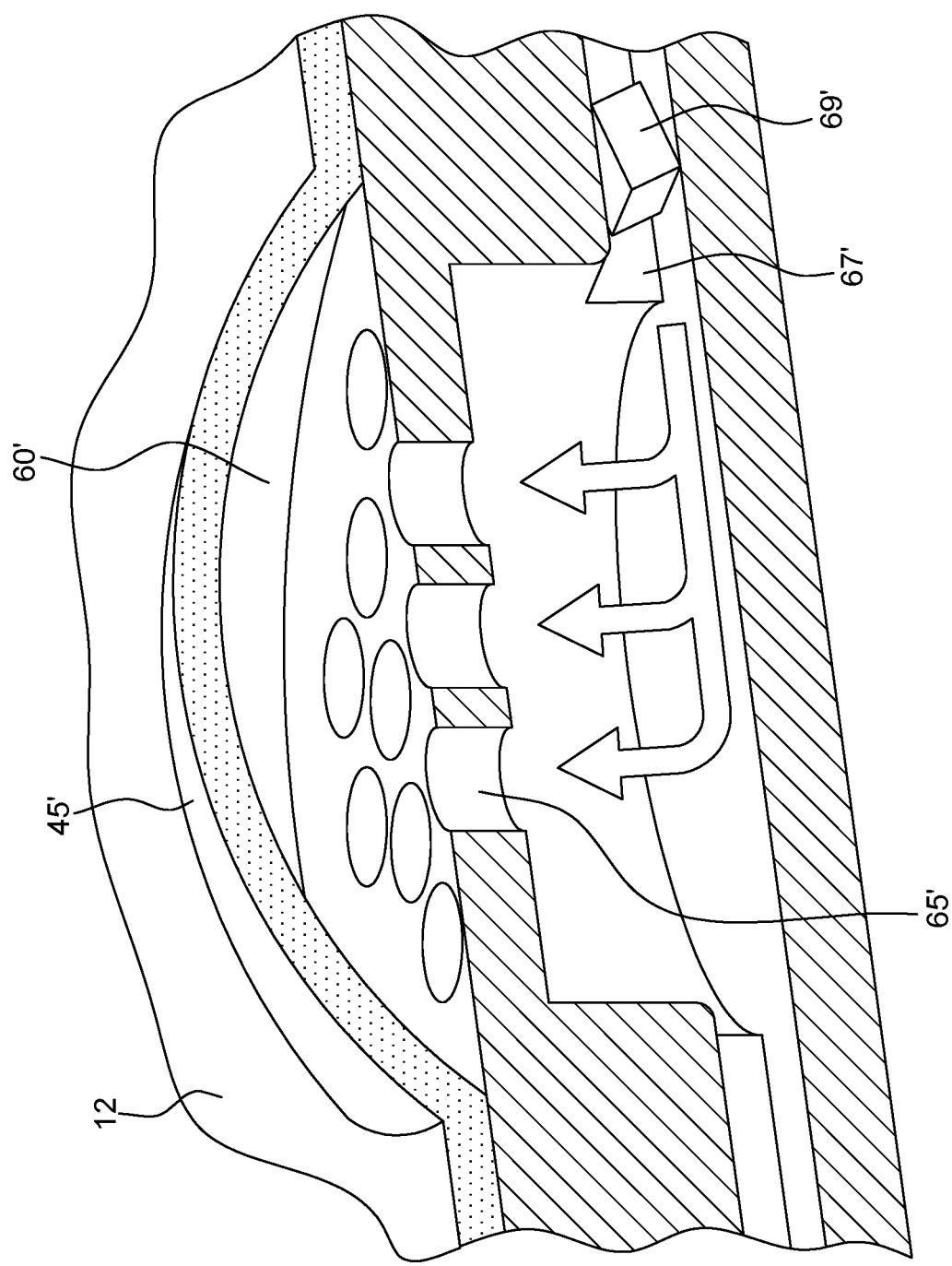
FIG. 11 is a cut-away, schematic view of a representative digital pen as shown in FIG. 8 displaying a cut-away of a circular microfluidic button contained within the pen body and underlying microfluidic layer embodying characteristics of the present invention.

FIGS. 8-11 show an alternative embodiment of the invention designated generally as 10'. Digital pen 10' is substantially the same as digital pen 10 with the exception that microfluidic buttons 45' are ovular or substantially circular in shape rather than ring-shaped as displayed in connection with the preferred embodiment displayed in FIGS. 1-7. As in the preferred embodiment of the invention displayed in FIGS. 1-7, the microfluidic buttons 45' are formed via action of a microfluidic layer 60' in the vicinity of contact points detected by the one or more sensors. As shown in FIGS. 10-11, with regard to the alternate embodiment, in forming ovular/circular microfluidic buttons 45', microfluidic grate 65' beneath pen body 12 allows the passage of pressurized microfluidic fluid through microfluidic canals 69' and locks 67' to generate microfluidic layer 60', when forming the ovular/circular microfluidic buttons 45'. Microfluidic buttons 45' may be used for actuation of various functionality by the digital pen 10', as further discussed herein.

Based on the foregoing, a digital pen 10 has been disclosed, however numerous modifications and substitutions can be made without deviating from the scope of the present invention. Therefore, the present invention has been disclosed by way of example and not limitation.

What is claimed is:

1. A digital pen comprising:
an external pen body surface surrounding the digital pen;
one or more sensors incorporated into the external pen body surface;
one or more microfluidic buttons formed from the external pen body surface and positioned only where a user is holding the digital pen, based on the sensed placement of the user's fingers on the digital pen by the one or more sensors,
the one or more microfluidic buttons formed via action of a microfluidic layer incorporated into the external pen body surface,
wherein each of the one or more microfluidic buttons are ring like and surround an entirety of the digital pen,
wherein the microfluidic layer comprises microfluid, microfluidic canals and microfluidic locks, wherein action of the microfluidic canals and the microfluidic locks control an amount of pressurized microfluidic fluid into the microfluidic layer through a microfluidic grate beneath the sensed placement of the user's fingers, causing a section of the pen body to blister and form each of the one or more microfluidic buttons;
a power source powering the digital pen;
a communication module, the communication module connecting the digital pen to a software module; and
a software user interface associated with a processor, the software user interface maps computerized functions to the one or more microfluidic buttons and maps action of the pen tip to the one or more computerized functions.

2. The digital pen of claim 1, further comprising:
a new set of one or more microfluidic buttons, formed from the external pen body surface and positioned only where the user is holding the digital pen, based on a new sensed placement of the user's fingers on the digital pen by the one or more sensors.

3. The digital pen of claim 1, wherein the one or more sensors are capacitive touch sensors incorporated into a flexible material incorporated into the external pen body surface.

4. The digital pen of claim 1, wherein the one or more sensors are resistive touch sensors incorporated into a flexible material incorporated into the external pen body surface.

5. The digital pen of claim 1, further comprising:
is a battery internal to the digital pen or an external power source connected by a cable which provides power to the one or more sensors.

6. The digital pen of claim 1, further comprising:
a battery located at an end of the digital pen.

7. The digital pen of claim 1, wherein the communication module utilizes a Bluetooth® connection, an infrared signal, or a cable.

8. A digital pen comprising:
one or more sensors incorporated into an external pen body surface surrounding the digital pen; and
one or more microfluidic buttons formed from the external pen body surface and positioned only where a user is holding the digital pen, based on the sensed placement of the user's fingers on the digital pen by the one or more sensors,
the one or more microfluidic buttons formed via action of a microfluidic layer en incorporated into the external pen body surface,
wherein the microfluidic layer comprises microfluid, microfluidic canals and microfluidic locks, wherein action of the microfluidic canals and the microfluidic locks control an amount of pressurized microfluidic fluid into the microfluidic layer beneath the sensed placement of the user's fingers, causing a section of the pen body to blister and form each of the one or more microfluidic buttons.

9. The digital pen of claim 8, further comprising:
a new set of one or more microfluidic buttons, formed from the external pen body surface and positioned only where the user is holding the digital pen, based on a new sensed placement of the user's fingers on the digital pen by the one or more sensors.

10. The digital pen of claim 8, wherein each of the one or more microfluidic buttons are ring shaped surrounding an entirety of the external pen body surface.

11. The digital pen of claim 8, wherein each of the one or more microfluidic buttons are substantially an oval shaped raised button formed from the external pen body surface.

12. The digital pen of claim 8, wherein each of the microfluidic buttons are substantially a circular raised button OH formed from the external pen body surface.

13. The digital pen of claim 8, wherein the one or more sensors are capacitive touch sensors incorporated into a flexible material incorporated into the external pen body surface.

14. The digital pen of claim 8, wherein the one or more sensors are resistive touch sensors incorporated into a flexible material incorporated into the external pen body surface.

15. The digital pen of claim 8, further comprising:
a battery internal to the digital pen or an external power source connected by a cable which provides power to the one or more sensors.

16. The digital pen of claim 8, further comprising:
a battery located at an end of the digital pen.

17. The digital pen of claim 8, further comprising:
a communication module utilizing a Bluetooth® connection, an infrared signal, or a cable connecting the digital pen to a software module.

18. A digital pen comprising:
one or more sensors incorporated into an external pen body surface of the digital pen; and
one or more microfluidic buttons surrounding an entirety of the pen body, formed from the external pen body surface and positioned only where a user is holding the digital pen, based on the sensed placement of the user's fingers on the digital pen by the one or more sensors,
one or more microfluidic buttons formed via action of a microfluidic layer incorporated into the external pen body surface,
wherein the microfluidic layer comprises microfluid, microfluidic canals and microfluidic locks, wherein the microfluid in a section of the pen body is raised beneath the sensed placement of the user's fingers, forming each of the one or more dynamically moveable microfluidic buttons;
a power source powering the digital pen;
a communication module, the communication module connecting the digital pen to a software module; and
a software user interface associated with a processor, the software user interface maps computerized functions to the one or more microfluidic buttons and maps action of the pen tip to the one or more computerized functions; and
a new set of one or more microfluidic buttons, formed from the external pen body surface and positioned only where the user is holding the digital pen, based on a new sensed placement of the user's fingers on the digital pen by the one or more sensors.

19. The digital pen of claim 18, wherein the one or more sensors resistive touch sensors incorporated into a flexible material incorporated into the external pen body surface.

* * * * *